3,217,358
FLAT DIE DEVICE FOR MOLDING PLASTIC MEMBERS
Eigo Kihara, 2393 Komaemachi, Kitatama-gun, Tokyo, Japan
Filed Aug. 19, 1964, Ser. No. 390,692
4 Claims. (Cl. 18—12)

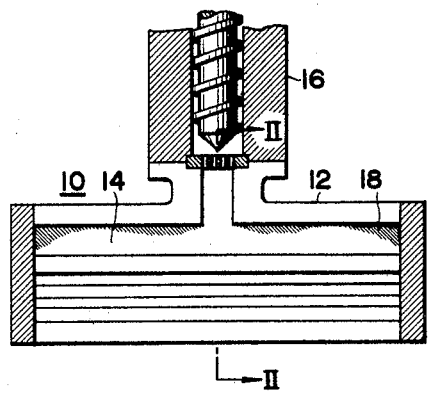
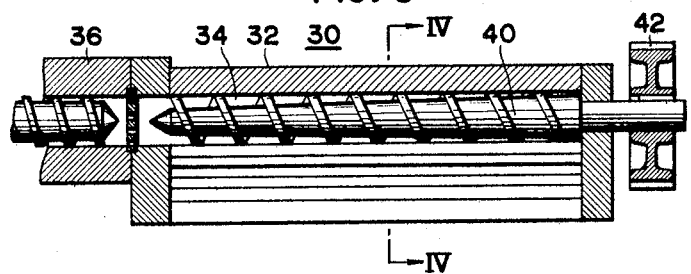
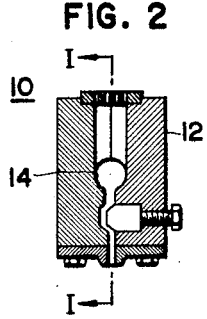
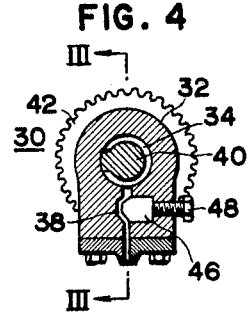

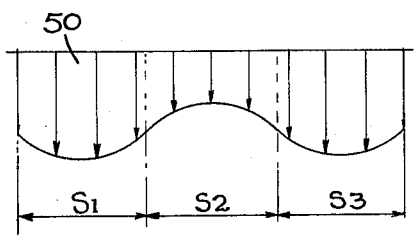
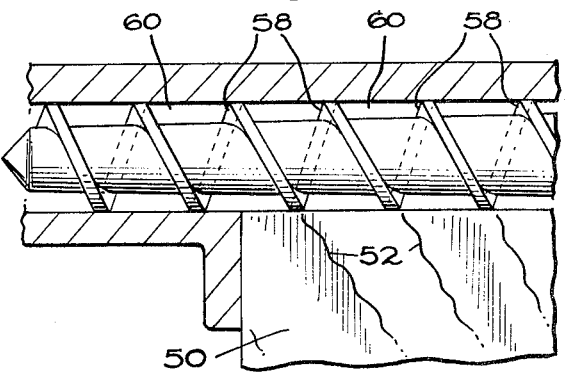
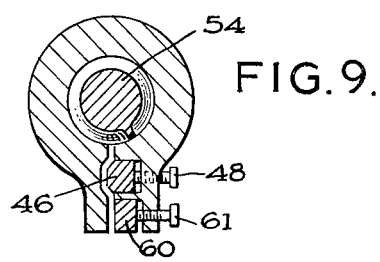
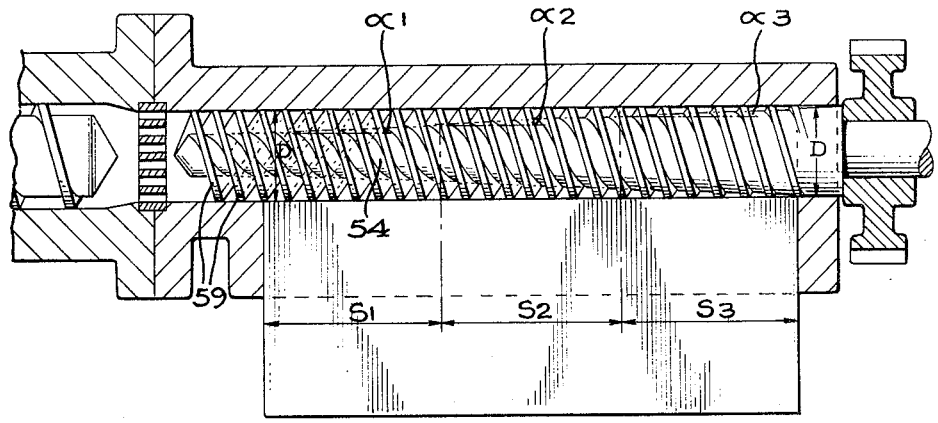
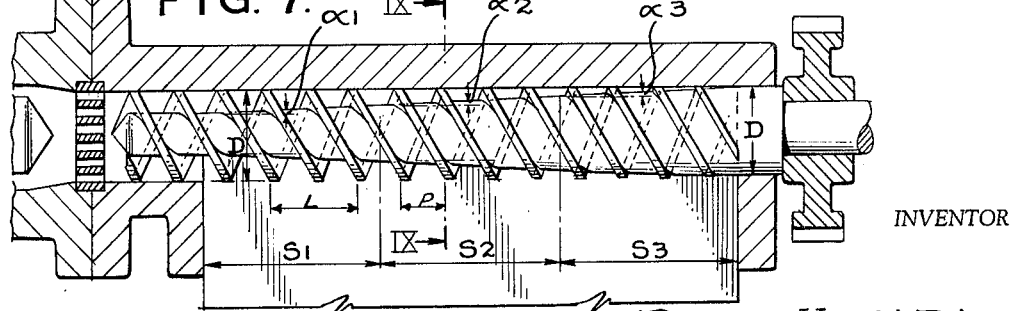

This application is a continuation-in-part of my application Serial No. 208,251, filed July 9, 1962, now abandoned, for Flat Die Device for Molding Plastic Material.

The present invention relates to flat die apparatus for molding plastic material, and more particularly, for continuously and more uniformly distributing and molding homogeneous plastic flat web or film members from a mass of plastic, whereby the film produced is characterized by a uniform thickness and density.

Heretofore, it has been found that the plastic mass or material as fed into the distributor channel of the conventional flat film-forming die body experiences a pressure drop as it is forced along said channel, and that the pressure which is exerted thereon is not always uniformly maintained or applied throughout the said channel adjacent the elongated die orifice of the extrusion apparatus. Accordingly the plastic material may be extruded into imperfect sheets or webs which are not uniform in thickness, width or density.

Accordingly, an object of the invention is to provide an improved flat die device for the continuous extrusion molding of web members, such as sheets, films and the like, from synthetic resinous plastics, which successfully overcomes the foregoing disadvantages.

It is also an object of this invention to provide a flat die device having a feed screw member progressively increased in minor diameter whereby a volume of the plastic material accommodated between a pair of adjacent threads on the screw member is progressively reduced from the extremity towards the roots portion of the screw member.

Another object of the invention is the provision of an improved flat die apparatus for the continuous extrusion molding of web members, such as sheets, films and the like from synthetic resinous plastics, which apparatus includes a multiple threaded feed extruder screw.

Still another object of the invention is the provision of an improved flat die device for the continuous extrusion molding of web members, such as sheets, films and the like, from synthetic resinous plastics, which successfully overcomes the foregoing disadvantages by relating the number of threads per lead of the extruder screw to the major diameter of the thread according to a predetermined formula.

An important object of the invention is the provision of a flat die device which enables the continuous extrusion of relatively wide sheets of synthetic resinous plastics, which do not have streaks on the surface thereof.

Another object of the invention is to provide an improved flat die device of the end-feed type, according to the preceding objective, which embodies an axially elongated multiple threaded feed screw rotatably disposed within an elongated distributor channel thereof, wherein said feed screw is provided with a progressively increased minor or root diameter commencing from the end adjacent the inlet of the distributor channel of the die body, until said minor diameter merges into the major diameter at the opposite end of said distributor channel.

A still further object is to provide an improved flat die device according to the preceding objectives, whereby the progressive angle of increase or taper of the root diameter of the screw is proportionally varied along its axial length adjacent the (extruder) die outlet according to a novel formula determined by pressure differentials.

Broadly, the present invention attains the foregoing objectives by providing apparatus comprising a die body having walls defining a longitudinally extended main space or distribution channel of circular cross-section and having its open end adapted to communicate with a discharge opening of an adjacently disposed extruder component, a slit provided in the die body adjacent to and communicating with said main space throughout the length of the latter, a feed screw member rotatably disposed within the longitudinal main space having one end portion extending externally through and projecting beyond an end wall, and the other end disposed opposite the discharge opening of said extruder component, the exposed extension of said feed screw member being adapted to be coupled with a drive for the screw feed member, said feed screw member being progressively increased in minor diameter from its extremity adjacent the open end of said main space toward its root portion adjacent the closed end wall thereof, whereby a volume of plastic material accommodated between a pair of adjacent threads on the screw member is progressively compressed therewithin from the said extremity and toward the said root portion of the screw member.

Another embodiment of the invention contemplates a multiple threaded screw member which is progressively increased in minor diameter from its extremity adjacent the open end of said main space toward its root portion adjacent the closed end wall thereof. Still another embodiment of the invention, and within the inventive scope thereof, contemplates a feed screw element which is variably increased in minor diameter from its end adjacent the die opening towards its root portion adjacent the closed end wall thereof in accordance with a novel formula.

The invention will become more readily apparent from the following detailed description taken in conjunction with the accompanying illustrative drawings, wherein:

FIGURE 1 is a view of a conventional flat die shown partly in elevation and partly in cross-section as taken along the line I—I of FIG. 2;

FIGURE 2 is a cross-sectional view taken along the line II—II of FIG. 1;

FIGURE 3 is a schematic view partly in elevation and partly in cross section of one embodiment of a device construction in accordance with the teachings of this invention, as taken substantially along line III—III of FIG. 4;

FIGURE 4 is a cross-sectional view taken substantially on line IV—IV of FIG. 3;

FIGURE 5 is a diagrammatic elevation illustration showing an example of the non-uniformly formed film product as extruded from a conventional flat die extruder as illustrated in FIGURES 1 and 2.

FIGURE 6 is an enlargd fragmentary detail view showing the extrusion of a sheet of material by a single-thread extruder distribution screw;

FIGURE 7 is a view in cross-section and partly in elevation showing an extruder-distribution screw, the root diameter of the screw varying in its angles of inclination throughout a plurality of sections of its length;

FIGURE 7a is an illustration of the taper angles of sections $S_1$, $S_2$ and $S_3$ as shown in FIG. 7.

FIGURE 8 is a view partly in cross-section and partly in elevation showing another embodiment of the extruder-distribution screw of this invention showing a multiple thread extruder-distribution screw, the root diameter of the screw varying in its angle of inclination throughout a plurality of sections of its length; and FIGURE 9 is a detailed cross sectional view as seen on line VIII—VIII of FIG. 7.

Referring now to FIGS. 1 and 2 of the drawings, there is illustrated the more conventional prior art type of flat die device which is adapted to be coupled with an extruder feed screw component for the extrusion molding of web members such as relatively thin sheets, films and the like as molded from masses of synthetic resinous plastic materials. A flat die device, generally designated by the reference numeral 10, comprises a die body 12 provided with suitable wall members to define therewithin a longitudinal main space or distributor channel of circular cross-section designated at 14 which is adapted for operative communication with a center-feed-screw component 16 of the extruder at the latter's end. A plastic material to be molded is forced or expressed from the feed screw 16 into the elongated main space or channel 14 whereupon it flows transversely in opposite directions from the center feed and is then extruded from the die device 10 to form a web member. However, with this arrangement of prior art device, a portion of the plastic material in the area 18 of the main space 14, as indicated therein by oblique lines of shading, tends to cease to flow and hence not be extruded. If a plastic material such as polyvinyl chloride which is susceptible to being readily decomposed by heat is to be molded, then the portions designated in the areas 18 of the main space 14 will begin to decompose, to the end that it is substantially impossible to effect a continuous or uniform molding operation.

The present invention is designed to overcome the aforesaid drawbacks.

Referring now to FIGS. 3 and 4 of the drawings, there is illustrated a flat die device constructed in accordance with the teachings of the invention. A flat die device generally designated by the reference numeral 30 comprises a die body 32 provided in its interior with a longitudinal main space or distribution channel 34 of circular cross-section having an open end adapted to be operatively connected to a discharge opening of an adjacently disposed feed-extruder component 36 which may be of conventional construction. The die body 32 is provided with an elongated discharge opening of slit 38 extending into the longitudinal main space 32 throughout its length.

Within the main space 34 a feed screw member 40 is rotatably disposed with one end reaching substantially the open end of the main space 34 which communicates with the discharge opening of extruder 36, and with the other end portion extending externally through the wall of the space 34 at the opposite end. The exposed extension of the screw member 40 is disposed in such a manner that the lands or crests of the threads are substantially in sliding contact with the periphery of the main space. Screw member 40 is progressively increased in minor diameter from its extremity adjacent the open end of the main space 34 toward its root portion adjacent the closed end of the same, whereby a volume of the plastic material accommodated between a pair of adjacent threads on the screw member is progressively reduced from the open-end extremity toward the root portion of the screw member. This ensures that the flat die device extrudes the plastic material substantially uniformly through the slit 38 over the entire length thereof.

In order to adjust the flow rate of the plastic material within the slit 38 and to further uniformly extrude it through the slit, an adjusting bar 46 is slidably provided in the slit 38 and such that its free end surface forms wall portion of the slit 38 and that it is moved toward and away from the opposite wall of the slit. To this end, the adjusting bar 46 is operatively movable by means of adjusting screws 48 (only one of which is shown in FIG. 4) threaded into the cooperatively aligned threaded holes formed in the die body 32 on the lower and righthand portion as viewed in FIG. 4.

The device of the invention thus far described is operated as follows:

Assuming now that the feed screw member 40 is being rotated in the direction of arrow shown in FIG. 3, the extruder 36 will force the plastic material to be molded, through the discharge opening thereof into the longitudinal space or distribution channel 34 in the die device 30. Then the material which is forced into the space 34 is advanced, in a stirred or mixed state, around and along the screw member 40 by its rotation, and at the same time is extruded uniformly through the slit 38 to form a web member.

If, initially, the plastic material is not uniformly extruded through the slit, then the adjusting screws 48 can be rotated to control the position of the adjusting bar 46 relative to the opposite wall of the slit 38 to adjust the pressure and rate of flow of the plastic material whereby the same will be uniformly extruded through the slit. Alternatively, the rotational movement of the screw member 40 may be continuously varied to provide the uniform distribution of pressure of the plastic material on the exit of the slit over the entire length of the same.

For a given viscosity of the plastic material and a given amount of the material to be extruded per unit time, the screw member may be rotated together with the feed screw member in the extruder at the same speed of rotation by a common drive with both screw members either formed integrally with each other or rigidly connected to each other.

From the foregoing it will be appreciated that a flat die device according to this embodiment of the invention can continuously extrude a plastic material to be molded through its extruding slit with no portion of the material stagnated in any area of the interior of the die device because of the provision of stirring means such as a feed screw member accommodated in the die device.

Where a feeder screw is utilized which is progressively tapered in minor diameter from the end adjacent the extrusion orifice 60 toward the root portion, the area (square measure) between the root diameter and the major diameter of the screw, as determined by the formula $$\text{Area} = \frac{\pi(D^2 - d^2)}{4}$$

must decrease regularly from the free tip of the root or base of the screw. This progressive increase in diameter enables the extrusion of plastic materials relatively equally for the entire length of the die.

Furthermore, to achieve the most efficient operation of the extruder screw, it is preferred to maintain the feed extruder's outlet pressure higher than 80 kg. cm.$^2$ and additionally provide a sharply tapered point at the free end of the screw, where it terminates adjacent the inlet of the feed extruder 36.

While the aforedescribed embodiments of this invention enables the extrusion of plastic material under substantially equal pressure for the entire length of the die, hence providing substantially uniform plastic sheets, where wider plastic sheets are desired, e.g. about 500 mm. and above, the back current or pressure created by the internal pressure of the die screws must be taken into account.

When a plastic material is die molded in wider sheets, the sheets are not even and smooth and in addition, vary in thickness dependent upon the width of the sheet. It was unexpectedly discovered that when a wider sheet is die molded utilizing the progressively tapered single threaded feed screw, three clearly defined zones are readily observable which zones are attributed to pressure differentials. FIG. 5 schematically depicts an extruded sheet 50 of plastic material 1000 mm. wide. Three clearly defined and substantially equal zones $S_1$, $S_2$, and $S_3$ developed, which graphically illustrates the pressure differentials. The volume of extrusion at $S_1$ was 35% greater than the desired average due to the extruder pressure, zone $S_2$ showed a volume of 40% less because of the lack of pressure, in this middle area, while zone $S_3$ exhibited 30% greater volume than the desired average which is attributable to the back current force or pressure caused by the narrowing or tapering clearance between the screw face and the cylindrical walls of the distribution channel 34. Die molded sheets of other widths exhibited this same phenomena. In addition to unequal thickness, the wider sheets formed by die molding often exhibit streak lines as shown by numeral 52 in FIGURE 6 which may be attributed to pulling by unequal pressures exerted on the zonal edges of the sheets.

Utilizing the differences in volume of the molded sheets in the defined zones $S_1$, $S_2$, and $S_3$, the angle of inclination of the root diameter of the feeder screw may be readily calculated for each zone to eliminate the pressure differential along the entire length of the feeder screw. In other words, to eliminate the pressure differential it was determined differently for the respective lengths of each of the three sections $S_1$, $S_2$, and $S_3$ within the following limits; and the respective varying angles of inclination of the taper with respect to the axis of the extruder die screw 54 of this embodiment as shown in FIGURES 7 and 7a are designated $\alpha_1$, $\alpha_2$, and $\alpha_3$. As shown in FIGURES 7 and 7a, the taper angles $\alpha_1$, $\alpha_2$ and $\alpha_3$ extend the variable angle of the root diameter against the axis line of the screw. By way of example, the following angles of inclination were calculated for this feeder screw in the flat die device of this invention for molding a 1000 mm. wide plastic sheet.

Diameter of screw: 55 mm.

| Section | Formula |
|---|---|
| $S_1$ | Tan $\alpha_1 = 4.929 \times 10^{-3}$ to $5.223 \times 10^{-3}$ |
| $S_2$ | Tan $\alpha_2 = 7.462 \times 10^{-3}$ to $8.450 \times 10^{-3}$ |
| $S_3$ | Tan $\alpha_3 = 5.447 \times 10^{-3}$ to $5.923 \times 10^{-3}$ |

By maintaining the taper or angle of inclination of the root diameter for the respective sections within the above-defined limits, very satisfactory results are obtained. It is preferred that the feed capacity of said extruder screw be kept at a high level. It was discovered that the feed capacity of the extruder screw may be substantially increased by maintaining the major diameter D and the lead L of the screw 54 substantially equal. The term lead, designated in the drawings as L, means the length from one thread to the next thread in a serial (screw) thread without regard to the (screw) thread member of the multi-(screw) threads. The pitch in multi-threaded screw, designated as P in the illustration of FIG. 7 is determined by the following formula:

$$\frac{\text{Length of } L}{\text{number of screw thread}} = P$$

Excellent results were obtained when the lead angle was, for example, approximately 17° 30′.

As mentioned hereinbefore, pressure at points 58 in FIG. 6 is much greater than that at points 60 because the direct left side of the screw threads, as viewed in FIG. 6, oppose or work against the flow current of the plastic material. Therefore, as these pressure differentials occur, they tend to create the aforementioned streaks 52 on the surface of the extruded web products. Accordingly, in the preferred embodiment of the invention, a multiple threaded screw having a narrower pitch, as illustrated by numeral 62 in FIG. 8 is used.

Referring particularly to FIGURE 8 there is shown an extruder screw 54, the root diameter of which changes its angle of inclination at points $\alpha_1$, $\alpha_2$, and $\alpha_3$ to eliminate the pressure differentials iimparted to the material along the length of the screw. Multiple threads 59 are provided to eliminate streaking in the extruded sheets.

The formula $N=KD$ was devised to determine the proper number of threads to be used in this multiple thread screw, wherein $N$=the number of threads, $K$=a reasonably constant figure having a slight range of from 0.0546 to 0.0727 and used to designate the ratio between the number of screw threads and its major diameter, and $D$=the major diameter of the extruder die screw 54. An example of the specifications of one very satisfactory die screw as used to successfully extrude a very uniform 1000 mm. wide web or film of polyvinyl chloride is as follows:

Screw=4 threads (per lead)
Screw diameter=55 mm.
Screw lead=55 mm.
Screw pitch=12–14 mm.

Using the formula $N=KD$ and substituting corresponding values therein, the upper range of the K value was determined as follows $$K = \frac{N}{D}, K = \frac{4}{55} \text{ or } K = 0.0727$$

An example of how the lower limit 0.0546 of the established value of the constant K works to determine the number of threads that may also be used successfully is as follows.

$$N=KD; \quad N=.0546 \times 55 = 3.0030$$

Therefore three screw threads per lead may be used if desired to attain substantially equally acceptable product results.

It is apparent that very satisfactory results may be achieved by using extruder-die screws wherein the ratio of the number of threads per lead to the major diameter of said screw is maintained within the range of 0.0546 to 0.0727.

As shown in FIGURE 9, an adjustable lip 60 may be provided to aid in a fine development of back pressure. Lip 60 is adjusted by set screw 61.

Accordingly, in view of the foregoing, it is apparent that an improved flat die extrusion mold of the class described is provided which achieves the objects and advantages as set forth in the preamble and throughout the specification.

While specific details have been herein shown and described, the inventive scope is not confined thereto since some changes and alterations may be made without departing from the spirit and scope thereof as defined in the appended claims.

I claim:
1. A flat die extrusion mold of the class described which comprises a die body having walls defining a longitudinal main space or distribution channel of circular cross-section having one open end and one closed end, said die body being adapted for operative end-feed mounting with the open end disposed adjacent to and for communication with a discharge opening of a feed extruder; said die body having an elongated discharge opening or slit in operative communication with said distribution channel throughout the length of said die body; a feed screw member having a uniform major diameter rotatably disposed within said distribution channel and having one end extending through the closed end of said die body, drive means operatively connected to said latter end, said feed screw member being progressively increased in minor or root diameter from its end adjacent the feed extruder to the base end portion adjacent the inner closed end of the distribution channel, said feed screw member being divided into a plurality of sections and having said root diameter progressively increased at different angles of inclination for each of the plurality of sections, whereby a volume of plastic material to be extruded is accommodated between pairs of adjacent threads of the screw member, progressively reduced and distributed throughout the length thereof, and extruded from said die body in flat webs of uniform thickness and density.

2. A flat die extrusion mold of the class described as defined in claim 1, wherein the feed screw member is divided into a plurality of three sections designated $S_1$, $S_2$, and $S_3$, with the different angles of inclination of said root diameter with respect to the axis of the screw for the respective sections being designated $\alpha_1$, $\alpha_2$ and $\alpha_3$ respectively, said root diameter being varied differently for the respective section lengths within certain predetermined limits as defined by the following formula:

| Section | Formula |
|---|---|
| $S_1$ | $\tan \alpha_1 = 4.929 \times 10^{-3}$ to $5.223 \times 10^{-3}$ |
| $S_2$ | $\tan \alpha_2 = 7.462 \times 10^{-3}$ to $8.450 \times 10^{-3}$ |
| $S_3$ | $\tan \alpha_3 = 5.447 \times 10^{-3}$ to $5.923 \times 10^{-3}$ |

3. A flat die extrusion mold as defined in claim 1, wherein the extruder screw is of the multiple thread type having the screw lead substantially equal to the major diameter of the screw.

4. A flat die extrusion mold as defined in claim 3 wherein the number of threads per lead is determined according to the formula $N = KD$ wherein $N =$ the number of screw threds per lead, $K =$ a reasonably constant figure having a range of from 0.0546 to 0.0727 used to designate the ratio between said number of screw threads and its major diameter, and $D =$ the major diameter of the screw.

References Cited by the Examiner

UNITED STATES PATENTS 2,686,335   8/1954   Gross _____ 18—12
3,063,095   11/1962  Limback _____ 18—12

FOREIGN PATENTS 150,019    6/1951   Australia.
1,248,798  2/1960   France.
841,501    7/1960   Great Britain.

J. SPENCER OVERHOLSER, *Primary Examiner.*

WILLIAM J. STEPHENSON, *Examiner.*